Aug. 1, 1961 F. P. PRIESTLY Re. 25,016

HEATED WIRE-CUTTING DEVICE

Original Filed Aug. 18, 1958

INVENTOR.
FRANK P. PRIESTLY
BY C. G. Stratton
ATTORNEY

United States Patent Office

Re. 25,016
Reissued Aug. 1, 1961

25,016

HEATED WIRE-CUTTING DEVICE

Frank P. Priestly, Northridge, Calif., assignor to Link Research Corporation, Beverly Hills, Calif., a corporation of California Original No. 2,916,595, dated Dec. 8, 1959, Ser. No. 755,492, Aug. 18, 1958. Application for reissue Feb. 11, 1960, Ser. No. 8,205
13 Claims. (Cl. 219—29)

Matter enclosed in heavy brackets [ ] appears in the original patent but forms no part of this reissue specification; matter printed in italics indicates the additions made by reissue.

This invention relates to a device for cutting material, such as expanded polystyrene or the like, such material being a bubble-type plastic made by inflating cells of polystyrene with air. There are variations of such material as, for instance, thermo-setting, solid, foamed, etc. These materials all have the same property, that of being readily cut by a heated member, as a blade or wire.

An object of the present invention is to provide an electrically heated wire-cutting device in which the wire is normally out of electric circuit and, therefore, cold, and in which the material being cut serves to so displace the cold wire that the same automatically is placed in circuit and becomes heated substantially instantly. Thus, so long as cutting pressure is applied, the wire of the present device will cut, and cutting ceases only upon release of such pressure, since the wire cools as quickly as it heats up.

Another object of the invention is to provide a device of the character indicated in which the cutting wire is maintained under tension, the tension serving to restore the wire to an out-of-circuit position as cutting pressure is eased.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Figure 1:
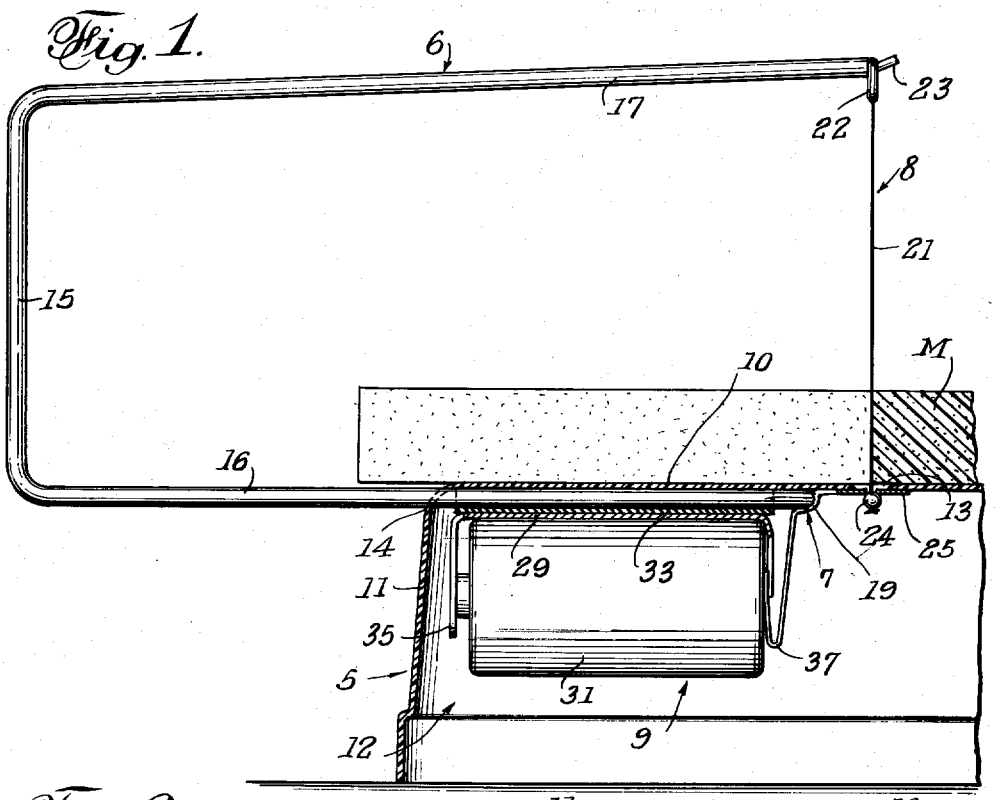
FIG. 1 is a broken longitudinal sectional view of a heated wire-cutting device according to the present invention.

The cutting device that is illustrated comprises, generally, a base 5, a gooseneck 6 carried by the base, means 7 for fixedly mounting the gooseneck, a wire means 8 extending between the gooseneck and the top of the base for cutting through material M disposed upon the base, and means 9 to place the wire 8 in electric circuit when pushed by said material.

The base 5 has a preferably rectangular form with a flat top 10 over the surface of which a slab, sheet or block of material M is adapted to be moved. The material M, as above explained, is preferably of the type that is capable of being cut by a heated wire as the same is pushed against such wire, the cutting being accomplished by a melting of the expanded polystyrene or the like of which the material may be comprised.

The top 10 is supported by side walls 11, an interior space 12 thus being provided in the base. Approximately centrally of its expanse, the top 10 is provided with a hole 13 through which the lower end of the wire 8 passes. At one end, the base is provided with a hole 14 immediately beneath the top 10.

The base 5 is made of dielectric material to be non-conducting, electrically, the base and walls thereof being thin, yet rigid, in the nature of sheet metal.

The gooseneck 6 is of generally U-shaped form, having a vertical leg 15 connecting arms 16 and 17. The arm 16 passes through the hole 14, as seen in FIG. 1, and the free end of the latter arm is provided with an offset or bend 18. It will be seen that arm 16 resides partly against the inner face of the base top 10 and extends partly beyond the base to bring the leg 15 considerably rearward of the base.

The arm 17 is so spaced above the base top that ample space is provided in the U of the gooseneck for a piece of material M to move, in a wide range, along the base top. Said arm [16] *17* is preferably slightly upwardly angled, as shown, the same being resiliently movable on the bend that joins said arm and the leg 15.

The means 7 is shown as a clip 19 that constitutes a socket for the bend 18 at the end of arm 16. Said clip is preferably riveted, as at 20, to the under face of the base top 10. Regardless how specifically designed, said clip affixes the gooseneck 6 to the base 5 against both endwise and rotational movement. The present construction depends on the means [9] *7*, as will later be seen, for preventing lateral movement of the gooseneck.

The wire means 8 comprises a wire 21 that is preferably formed of Nichrome or other high resistance material that becomes incandescent when a current of suitable potential is passed therethrough. One end of said wire is provided with an eye 22 that is adapted to hook onto an end projection 23 of the gooseneck arm 17. At the other end, the wire 21 is provided with an insulator 24, preferably of ceramic material. Said insulator is either spherical or is provided with a spherical face which, with the wire passed through the hole 13, is directed toward the under face of top 10.

Figure 3:
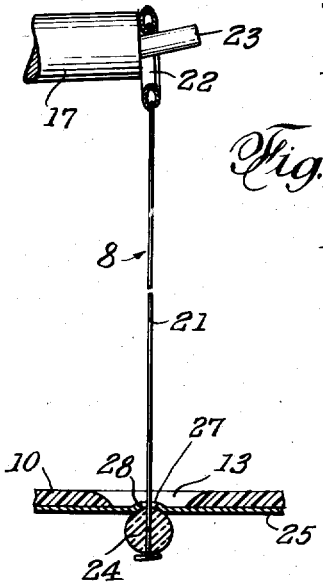
FIG. 3 is an enlarged detailed view showing the wire mount in its normal out-of-circuit position.
Figure 2:
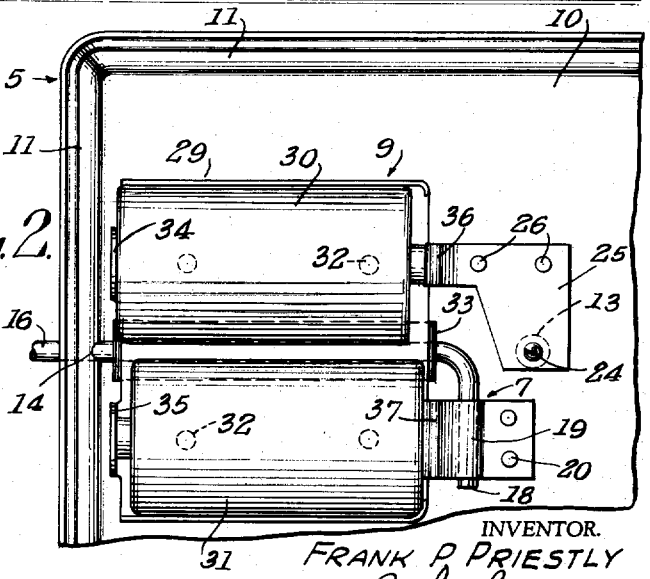
FIG. 2 is a broken bottom view.

The wire means 8 further includes a metal plate 25 that is affixed to the under face of base top 10 by rivets 26 and is formed with an aperture or opening 27 through which the wire 21 passes and which is considerably smaller than the opening 13 in said top. The openings 13 and 27 are preferably concentric, as may best be seen in FIG. 3. A spherical seat 28 is formed in the plate 25, the hole 27 being centered in said seat and the insulator 24 normally centering itself in the seat so the wire 21 passes through said hole 27 with uniform clearance all around.

The means 9 comprises a metal battery cell holder 29, here shown as designed to hold two dry cells 30 and 31 in side-by-side relation in the interior space 12 of the base. Said holder 29 is affixed to the base, as by rivets 32, and the same serves to clamp over the arm 16 of the gooseneck and to be insulated therefrom by an insulator 33. The holder 29 is provided with a terminal 34 for connection with one electrode of cell 30 and a terminal 35 for the comparable electrode of cell 31.

Said means 9 further includes a spring terminal 36 formed as an extension of plate 25 and engaged with the other electrode of cell 30, and a spring terminal 37 formed as an extension of clip 19 and engaged with the other electrode of cell 31.

It will be noted that the resilience of arm 17 keeps the wire 21 taut, and it is a simple matter to hook and unhook the wire, the length of which is made according to the size of the gooseneck.

The present device contains no switch, as such, and depends wholly on making and breaking the electric circuit through the wire 21 upon whether or not the wire touches the rim of hole 28. Since the insulator 24 normally centers on the seat 28, the wire does not touch and the circuit is open. When the material M is pushed against the wire 21, regardless of the direction of the push, the resilience of arm 17 allows the wire to become laterally displaced and a circuit *is* set up when the wire touches plate 25. Release of such pressure allows the wire and its insulator to re-center on seat 28 to open the circuit.

The circuit that is made, as above, passes through the gooseneck 6, clip 19, spring terminal 37, battery cell 31, terminal 35, holder 29, terminal 34, battery cell 30, spring terminal 36, plate 25, and wire 21.

Thus, the device provides automatic on and off switching which results in material cutting only when the wire is being pressed by the material M. Thus, as the different back and forth movements of the material are made, the circuit opens and closes accordingly, greatly conserving the lives of the cells 30 and 31.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A cutting device comprising a base having a surface on which material to be cut is adapted to be placed and moved therealong, a gooseneck, means fixedly mounting said gooseneck on said base, a resilient arm on said gooseneck being disposed in spaced relation to said base surface, a flexible heating wire extending between said base and the end of the mentioned gooseneck arm, means to supply heating current to said wire, and a shiftable connection between the base and the wire and constituting a switch in said circuit, the length of the wire being such in relation to gooseneck arm spacing that the resilient arm maintains the wire in tension.

2. A cutting device comprising a base having a surface on which material to be cut is adapted to be placed and moved therealong, a gooseneck, means fixedly mounting said gooseneck on said base, a resilient arm on said gooseneck being disposed in spaced relation to said base surface, a heating wire having first and second ends, separably connected at the first end to the resilient gooseneck arm, an insulator on the second end of the wire, an apertured electrically conducting member affixed to the base and through the aperture of which said wire extends with the insulator biased toward said member by the resilient arm, means formed in said member to normally center the insulator to hold the wire in clearance relationship to the aperture, and electric-current input terminals, electrically connected to the first end of the wire and to the apertured member to establish a wire-heating circuit through the wire upon shift of the wire into contact with the rim of the aperture in the member.

3. A cutting device according to claim 2 in which the insulator is spherical and the means formed in the member comprises a seat in which the insulator is engaged by the bias of the resilient gooseneck arm.

4. A cutting device according to claim 3 in which one of the input terminals is connected to the gooseneck and the gooseneck is electrically connected to the first end of the wire at all times.

5. In a wire-cutting device, a heating wire having first and second ends, means tensioning the wire in the direction of the first end, an insulator on the second end of the wire, an apertured current-passing member through which the wire extends towards its second end with all-around clearance and against which member the insulator is drawn by the tensioning means, and a source of electric-current terminating at one end at the apertured member and the other at the wire, lateral shift of the wire in the aperture to engage the apertured member closing the current between said member and wire.

6. In a wire-cutting device according to claim 5, means formed in the apertured member to normally center the insulator and the wire with the mentioned all-around clearance.

7. In a wire-cutting device, a metal plate provided with a seat and having an aperture centered in said seat, an end-biased heating wire passed through said seat with electrical clearance with respect to the plate, and an insulator on the end of said wire and in seating engagement with the seat under endwise bias of the wire to maintain said electrical clearance of wire and plate and to restore said clearance after the wire has been shifted to electrically contact the plate.

8. In a wire-cutting device, a gooseneck composed of electrically conducting material having a free hooked end and having a second end to which an apertured electrically conducting member is mechanically connected but insulated therefrom, a wire having a first end electrically connected to the hook end of the gooseneck and having a second end extending through said apertured member with an insulator at the end thereof, and current input terminals electrically connected to the second end of the gooseneck and to said electrically conducting apertured member, the wire being of such length as to be under tension whereby the insulator tends to center the second end of the wire in said aperture member out of electrical contact therewith, and lateral pressure upon the wire tends to move it against the apertured member for establishing an electrical circuit from said current input terminals through the wire.

*9. A cutting device comprising a support face, a wire cutter extending from a point above through said face, means to hold said wire in a normally predetermined position relative to said face, means connecting one end portion of said wire to one side of a source of electric current, and means connected to the other side of said current source and in spaced proximity to the other end portion of the wire and below said face, said latter means being engageable by the wire only upon deflection of the latter from its normally predetermined position to close the electric circuit through said wire to heat the same for cutting through a piece of work disposed on the support face and moved over the surface thereof.*

*10. A cutting device comprising a support face, a wire cutter extending from a point above through said face, means to hold said wire taut, means connecting one end portion of said wire to one side of a source of electric current, means connected to the other side of said current source and in spaced proximity to the other end portion of the wire and below said face, said latter means being engageable by the wire upon deflection of the latter to close the electric circuit through said wire to heat the same for cutting through a piece of work disposed on the support face and moved over the surface thereof, and means incorporated in the last-mentioned means to automatically restore the deflected wire to its mentioned spaced relation upon release from deflection thereof.*

*11. A cutting device comprising a support face, a wire cutter extending from a point above through said face, means to hold said wire taut, means connecting one end portion of said wire to one side of a source of electric current, and means connected to the other side of said current source and in spaced encircling proximity to the other end portion of the wire and below said face, said latter means being engageable by the wire upon lateral displacement from its normal tautly held position to close the electric circuit through said wire to heat the same for cutting through a piece of work disposed on the support face and moved over the surface thereof, and means em-*

*bodied in the last-mentioned means to automatically move the wire, when laterally displaced, back to its initial circuit-open position upon release from displacement thereof.*

*12. A cutting device comprising a material-supporting face having an opening, a wire extending through said opening, means to hold the wire taut with one end above the support face and the other therebelow, electrically conductive means adjacent to and below the support face and in spaced proximity to the wire at the lower end portion thereof when the wire is normally tautly held, and a source of electric current having one side connected to the other end portion of the wire and having the other side connected to the last-mentioned means, said wire and electrically conductive means being engageable upon deflection of the wire from said normally-held position by a piece of material on the support face to close the electric circuit from said source through the wire to heat the same to a material-cutting temperature.*

*13. A cutting device comprising a material-supporting face having an opening, a wire extending through said opening, means to hold the wire taut with one end above the support face and the other therebelow, electrically conductive means adjacent to and below the support face and in spaced proximity to the wire at the lower end portion thereof when the wire is normally tautly held,*

*a source of electric current having one side connected to the other end portion of the wire and having the other side connected to the last-mentioned means, said wire and electrically conductive means being engageable upon deflection of the wire from said normally-held position by a piece of material on the support face to close the electric circuit from said source through the wire to heat the same to a material-cutting temperature, and means incorporated in the last-mentioned means to automatically restore the deflected wire to its mentioned spaced relation upon release from deflection thereof.*

References Cited in the file of this patent or the original patent

UNITED STATES PATENTS

| | | |
|---|---|---|
| 2,221,330 | Schneider | Nov. 12, 1940 |
| 2,350,290 | Moore | May 30, 1944 |
| 2,554,371 | Marx | May 22, 1951 |
| 2,587,775 | Sheldon et al. | Mar. 4, 1952 |
| 2,646,494 | Fegan | Dec. 13, 1955 |
| 2,727,128 | Jaye | Dec. 13, 1955 |
| 2,812,397 | Taylor | Nov. 5, 1957 |
| 2,916,595 | Priestly | Dec. 8, 1959 |